United States Patent Office 2,943,059
Patented June 28, 1960

2,943,059

ION EXCHANGE GLASS AND USE

Warren R. Beck, Mahtomedi, and George C. Hann, Minneapolis, Minn., assignors to Minnesota Mining & Manufacturing Company, St. Paul, Minn., a corporation of Delaware No Drawing. Filed June 3, 1955, Ser. No. 513,156

12 Claims. (Cl. 252—179)

This invention relates to new porous glass articles of manufacture possessing improved properties and comprising a residual vitrified glass structure of novel composition.

The residual glass structure of the porous articles hereof is made up of a mixture of inorganic constituents the nature of which is such that an identically composed mixture of said materials in crystalline pulverized form is impossible to vitrify to form a glass under ordinary glass-forming conditions. Also, the residual glassy structure of our articles devitrifies rapidly when heated for a time at a temperature within the annealing range of the original glass composition from which it was formed by leaching. Such a temperature is within the range of approximately 400–800° C., varying with composition. Stated another way, devitrification, i.e., reversion to a crystalline state, occurs at temperatures within the range of 1200–1600° C. below the melting temperatures (which are over about 2000° C.) of our leached structures. Once devitrified by heating to an annealing temperature, which is considerably below the melting temperature of our structures, they cannot be readily revitrified.

Articles of this invention possess unusually improved properties heretofore never attained in glassy structures. They possess an extraordinarily high capacity to remove ions from solutions. They function as ion exchangers under extremes of temperature, pH, and radiative conditions where other solid particulate ion exchange materials either break down or fail to exhibit a sufficient ion exchange capacity to be effective. They are resistant to oxidative influences and to attack by strong acid solutions. This is a particularly advantageous property if our structures are used, for example, in an ion exchange application to decontaminate strongly-oxidizing, chromium-plating-bath solutions. The glassy structures are mechanically strong, crack-resistant, and are structurally stable under rather great extremes of temperature, i.e., up to approximately 400° C. and down to liquid air temperatures. Ionizing radiation does not cause a drop in the ion exchange capacity of our articles nor a significant degradation of their structure. Organic ion exchange resins, on the other hand, while possessing a high capacity for ion exchange under ordinary conditions, lose their ability to function as ion exchangers when subjected to radiative influences and break down at raised temperatures around approximately 150° C. In addition, organic resins swell or are soluble in many organic solvents whereas the articles hereof remain structurally and dimensionally stable therein. Of prior art glass materials, none is known which possesses a suitable capacity to be effective as an ion exchanger; and of known inorganic materials in general, none has an exchange capacity even approaching that usually exhibited by the glassy structures of this invention.

A particularly unusual use for our articles is the removal of radioactive ions, e.g., cesium, strontium, etc., from low pH solutions held at high temperatures on the order of approximately 250° C. under several thousand pounds of pressure. We know of no other material capable of effectively accomplishing this task. In addition, however, our articles are useful as adsorbents, catalysts, etc., in chemical processes generally. If desired, special catalytic agents may be attached by ion exchange or adsorption to our porous articles, and the resulting adsorbed ions reduced, in situ, if desired. This is especially advantageous in the case of rare and expensive catalysts. A variety of other uses of the articles hereof, both unusual and conventional, is apparent from a study of the unique properties possessed by our articles and an understanding of their composition as set forth herein.

The exact form of the individual inorganic materials in our vitrified structures is not, of course, definitely known; however, for convenience and in accordance with general practice in the glass art, we have chosen to set forth the individual inorganic constituents as being presumptively present in an oxide form. Likewise, for convenience and in the interest of accuracy, we have chosen to set forth the various constituents of our vitrified structures in terms of unit cations, combined with just sufficient oxygen to satisfy the valence of the particular cation, e.g., as $NaO_{0.5}$, $CaO$, $BO_{1.5}$, $TiO_2$, $PO_{2.5}$, etc., even though this practice sometimes superficially indicates that oxygen atoms are split. Following the aforespecified practice, the "mol percent" of inorganic constituents in our composition is calculated on the basis of cation-oxide formulas which always indicate the presence of a single cation per "mol." Consequently, "mol percent," as used herein, becomes identical with the term "cationic percent," as well as identical with the more descriptive term "cationic mol percent."

Broadly, the residual glass structure of our articles contain at least 90 mol percent of a combination of inorganic constituents meeting the compositional requirement, as determined by analysis, set forth in the following table wherein approximate amounts are specified in mol percent.

Table 1

| | |
|---|---|
| $TiO_2$ | 0–40 |
| $ZrO_2$ | 0–35 |
| $HfO_2$ | 0–35 |
| $TiO_2 + ZrO_2 + HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5} + BO_{1.5}$ | 20–70 |
| Fluxes | 0–15 |
| $BO_{1.5}$ + fluxes | 0–25 |

The fluxes, if present in our structures, are selected from alkali and alkaline earth oxides, e.g. $LiO_{0.5}$, $NaO_{0.5}$, $KO_{0.5}$, $CaO$, $MgO$, $SrO$, $BaO$, $Rb_2O$, etc.

It will be noted that a required content, i.e., at least 10 mol percent and up to the approximate limits specified in the table, of $TiO_2$, $ZrO_2$, $HfO_2$, or mixtures thereof, is present in our structures. Also a required content, i.e., 20 to 70 mol percent, of $PO_{2.5}$ is present in our structures. We believe that $TiO_2$, $ZrO_2$ and $HfO_2$ combine in a unique manner with $PO_{2.5}$ in the process of making our glasses, and that the product so formed is largely responsible for the unique characteristics possessed by the structure. The process of first melting an amorphous mass and then selectively leaching a portion plays an important role in imparting to our glass articles their unique properties, particularly those of high ion exchange capacity.

Other components mentioned in the foregoing table may or may not be present in our residual structures and for that reason they are set forth as optional ingredients.

If present, they do not exceed the approximate quantities specified in the table. From the standpoint of ease of melting the original raw batch used in making our articles, $SiO_2$ or $AlO_{1.5}$, or both, are desirably included in the composition and a minimum amount, i.e., 2% or more, of either $SiO_2$ or $AlO_{1.5}$, or both, desirably remains in our porous structures contributing to their physical strength. Similarly a residual amount of $BO_{1.5}$, i.e., an amount above a trace or 1%, is frequently in our structures, although it is not an essential constituent and may be absent. When present, it is easily tolerated by the articles without loss of fundamental properties, e.g., ion exchange properties, desired. $BO_{1.5}$ is a preferred constituent of the original mixture of inorganic materials used in making our articles inasmuch as it improves glass formation and surprisingly also contributes to the strength of the residual structure, although it is largely removed therefrom during leaching. The total content of $BO_{1.5}$ and $PO_{2.5}$ in our structures has an upper limit of approximately 70 mol percent. In addition, the total amount of $BO_{1.5}$ and all alkali and alkaline earth metal fluxes, if such constituents are present in the residual structure, does not exceed approximately 25 mol percent. Usually our structures contain a total of at least approximately 2 mol percent of inorganic constituents selected from among the optional constituents set forth in the foregoing table. These optional constituents are $SiO_2$, $AlO_{1.5}$, $BO_{1.5}$, and the alkali and alkaline earth metal fluxes. Their presence, particularly the $SiO_2$, $AlO_{1.5}$, or $BO_{1.5}$, in small amounts in the leached structure indicates that the structure was formed with these constituents in the original glass melt, a factor which in turn has been found to cause a rather significant improvement in the strength properties as well as ion exchange characteristics of the articles hereof resulting from leaching.

Such metals as cadmium, zinc, tungsten, lead, tin and others not specifically mentioned in the foregoing table may also be present, presumptively in oxide form, in our leached structures, but are not present in excess of approximately 10 mol percent. They are not essential ingredients.

In Table II, the chemical analysis of several illustrative structures of our invention is set forth. For convenience we also set forth in Table II the analysis of the starting raw batch used in making each article.

The most preferred structures of our invention are those in the form of small glass beads having a diameter smaller than or below approximately 2 mm. and which have a composition within Table I, but in addition containing a required content of at least 10 mol percent of $ZrO_2$ and not more than 35 mol percent thereof. Other inorganic constituents of these preferred articles are selected from Table I and within the percentage range specified but not more than 30 mol percent of $TiO_2$ or $HfO_2$ or both can be present in these articles. All of these articles exhibit an unusually high ion exchange capacity, i.e., on the order of more than approximately 4 milliequivalents per gram, even above 5 meq./gm. as illustrated in Examples 1–9 inclusive, hereof. They in addition exhibit a great resistance to acid attack and are particularly useful in ion exchange applications conducted under ionizing radiation.

Articles hereof containing a significant amount of hafnium oxide possess especially advantageous properties particularly with respect to chemical resistance and neutron absorption.

The ion exchange capacity of our porous articles is set forth in Table III in milliequivalents per gram of material, which is a standard measurement for ion exchange capacity. The values in the table represent the maximum ion exchange capacity of the identified examples and are attained at a pH of approximately 11 using the following test procedure. To a one gram sample in a vessel is added 100 ml. of 0.1 normal sodium hydroxide solution and the whole shaken to equilibrium. Shaking of the contents of the vessel for one day is suitable for reasonably accurate maximum capacity determinations, although a three day shaking period is preferred for extremely precise determinations. Thereafter, the solution is drained from the sample and titrated with 0.1 normal solution of hydrochloric acid. The milliequivalents of hydrochloric acid used in titration subtracted from the milliequivalents of sodium hydroxide added to a

*Table II*

| Example number | | $TiO_2$ | $ZrO_2$ | $HfO_2$ | $SiO_2$ | $AlO_{1.5}$ | $BO_{1.5}$ | $PO_{2.5}$ | $ThO_2$ | $NaO_{0.5}$ | |
|---|---|---|---|---|---|---|---|---|---|---|---|
| 1 | x | | 6.8 | | 6.8 | 6.8 | 22.7 | 19.9 | | 37.0 | |
|   | y | | 30.0 | | 3.0 | 4.0 | tr | 63.0 | | tr | |
| 2 | x | | 6.0 | | | 12.0 | 26.0 | 22.0 | | 34.0 | |
|   | y | | 31.3 | | | 1.7 | tr | 67.0 | | tr | |
| 3 | x | | 6.0 | | | 9.0 | 33.0 | 20.0 | | 32.0 | |
|   | y | | 33.5 | | | 2.0 | tr | 64.5 | | tr | |
| | | | | | | | | | | | $KO_{0.5}$ |
| 4 | x | 1.1 | 5.7 | | 5.7 | 5.7 | 25.0 | 17.6 | | 33.0 | 6.2 |
|   | y | 5.1 | 26.8 | | 7.4 | 1.6 | 0.5 | 56.9 | | tr | 1.7 |
| 5 | x | | 5.0 | | | 10.0 | 33.0 | 20.0 | | 32.0 | |
|   | y | | 31.5 | | | 3.3 | 3.6 | 61.6 | | tr | |
| 6 | x | 4.0 | 8.0 | | | | 35.0 | 21.0 | | 32.0 | |
|   | y | 11.2 | 24.4 | | | | 9.3 | 55.1 | | tr | |
| 7 | x | 1.1 | 5.7 | | 5.7 | 5.7 | 25.0 | 19.9 | | 36.9 | |
|   | y | 4.8 | 18.7 | | 17.8 | 2.3 | 8.8 | 43.0 | | 4.6 | |
| | | | | | | | | | | | ZnO |
| 8 | x | | 12.0 | | | | 33.0 | 20.0 | | 31.0 | 4.0 |
|   | y | | 31.0 | | | | 10.1 | 56.8 | | 2.1 | tr |
| 9 | x | | 6.8 | | 18.2 | 6.8 | 11.4 | 19.9 | | 36.9 | |
|   | y | | 14.4 | | 33.0 | 2.6 | 9.5 | 29.8 | | 10.7 | |
| 10 | x | 8.0 | | | | | 35.0 | 21.0 | 4.0 | 32.0 | |
|    | y | 25.8 | | | | | 21.1 | 52.6 | 0.5 | tr | |
| | | | | | | | | | | | CdO |
| 11 | x | 8.0 | | | | | 29.0 | 21.0 | 4.0 | 32.0 | 6.0 |
|    | y | 30.0 | | | | | 15.5 | 46.5 | 1.0 | 6.5 | 0.5 |
| | | | | | | | | | | | CaO |
| 12 | x | 6.0 | | | 6.0 | | 36.0 | 22.0 | | | 30.0 |
|    | y | 13.9 | | | 19.1 | | tr | 63.5 | | | 3.5 |

*x*—mol percent of constituent in unleached glass.
*y*—mol percent of constituent in porous article hereof.
tr—trace amount in resulting structure.

Table III

| Example Number | Maximum ion Exchange capacity in Milliequivalents Per Gram | Effective surface area in square meters per gram | Time of Leaching in Hours |
|---|---|---|---|
| 1 | 6.5 | 650 | 16 |
| 2 | 6.7 | 510 | 50 |
| 3 | 6.8 | 670 | 24 |
| 4 | 5.9 | 450 | 4 |
| 5 | 6.7 | 510 | 7 |
| 6 | 6.5 | 650 | 12 |
| 7 | 6.7 | 620 | 12 |
| 8 | 5.4 | 460 | 72 |
| 9 | 5.4 | 405 | 250 |
| 10 | 4.8 | 410 | 24 |
| 11 | 4.6 | 490 | 24 |
| 12 | 5.7 | 530 | 30 | sample gives the ion exchange capacity of the sample in milliequivalents per gram. For example, 10 milliequivalents of sodium hydroxide (100 ml. x 0.1 normal) were added to a one gram sample of Example 1 and the whole shaken for three days at room temperature. The solution was then drained off and titrated using 3.5 milliequivalents of hydrochloric acid (35 ml. x 0.1 normal). The example, therefore, was found to possess a maximum ion exchange capacity of 6.5 milliequivalents per gram (10 meq.—3.5 meq.=6.5 meq.) in the sodium-hydrogen cycle.

All of the glass structures hereof have a maximum ion exchange capacity, as determined by the foregoing test, greater than approximately 2 meq./g., even if subjected to generally adverse conditions during the process of making the same. Preferred structures thereof possess extraordinarily high capacities always above 4 meq./g. as hereinabove noted.

The high ion exchange capacity of our preferred articles may be readily appreciated by a comparison with the maximum capacity of ion exchangers of the prior art. Natural Montmorillonite clays, of the type used as petroleum cracking catalysts, are reported to have a maximum capacity between 0.8 and 1.2 meq./g. Synthetic aluminum silicate ("Permutit") is reported to have a maximum capacity between approximately 1.0 and 3.0 meq./g. These materials cannot withstand extremes of pH such as employed in the test procedure above, and break down under such conditions. A well known commercially available nuclear sulphonic ion exchange resin exhibited a maximum capacity of 4.25 meq./g. using the foregoing described test procedure, while a carboxylic ion exchange resin exhibited a maximum capacity at the end of 3 days of 10 meq./g. in the test described herein. Of all known ion exchange materials, therefore, only the carboxylic resin exhibited a higher maximum capacity per unit of weight than that exhibited by our articles. On a volume for volume basis, however, the maximum capacity of the carboxylic resin was only approximately ⅔ as great as the capacity of the same volume of the preferred structures hereof.

It should be noted that as temperature is raised, our articles increase greatly in their rate of ion exchange. For example, at approximately 50° C. maximum capacity is usually attained within less than about one hour. At 100° C. maximum capacity is usually attained within a few minutes. As the pH of a solution in which our articles are to act as ion exchangers is reduced, the capacity for ion exchange drops approximately linearly. At a pH of 7, our glassy structures exhibit a capacity between approximately 2 and 4 milliequivalents per gram, which is approximately double the capacity of inorganic zeolitic materials at this pH. At extremely low pH, e.g., pH 1, the ion exchange capacity exhibited by our structures varies somewhat with the ions present in a test solution. As a specific but non-limitative illustration of the high activity of our articles, it may be particularly pointed out that Example 1 hereof possesses at low pH values an extraordinarily high ion exchange capacity, even what might be termed an affinity, for certain ions such as thorium, protoactinium, iron, cobalt, and nickel.

The effective surface area values in square meters per gram of the leached articles hereof were obtained using the Brunauer-Emmett-Teller (B.E.T.) method. This method for the measurement of effective or apparent surface area of adsorbents is highly developed, well-known, and has been the subject of many technical papers. We incorporate by reference the disclosure of this teaching which is set forth, in an article by P. H. Emmett, entitled "A New Method for Measuring the Surface Areas of Finely Divided Material and for Determining the Size of Particles," appearing on page 95 of a published volume entitled Symposium on New Methods for Particle Size Determination in the Subsieve Range, containing the minutes of the Washington Spring Meeting, March 4, 1941, of the American Society for Testing Materials.

By the B.E.T. method for testing effective surface area, we have found that all our articles have an absolute area greater than approximately 100 square meters per gram and, in most cases, as illustrated by the table, an absolute area greater than approximately 300 square members per gram. An effective area above approximately 300 square meters per gram is preferred for most ion exchanger and adsorbent applications. If our articles are dried in air, however, a decrease in their maximum effective surface area is generally obtained. In those cases in which we wish to dry our articles and yet maintain essentially the maximum effective surface area, we prefer to use a vapor technique in drying as more particularly set forth below.

Our articles are made by mixing together appropriate beginning ingredients and melting the mixture to a homogenous state at high temperatures, after which the melt is cooled under conditions to form a glass structure and the glass leached preferably with an acid solution. The resulting porous glassy structure may then be dried, if desired, or stored in a water or other solvent bath from which it is taken directly for use in ion exchanger or other operations.

The mixture of raw ingredients used in making our structure may vary in composition widely. Many ingredients other than those specified in Table I may be included in the original glass batch. Leaching, however, largely removes components other than those required in the final composition as specified in Table I. In making up our raw batch, we select raw materials such as sodium carbonate, boric acid, potassium phosphate, zircon, hydrated alumina, borax, etc., which are employed in amounts required to give, on mixing and melting, an analysis falling within Table IV. It should be emphasized that in Table IV we illustrate the mol percent ranges for ingredients in our original glass melt, and optional ingredients set forth in the table are present in the original glass melt in an amount sufficient to make up a composition totaling 100 cationic mol percent. The specified percent ranges may vary somewhat and components other than those specifically listed in the table may also be present in the melt.

Table IV

| | |
|---|---|
| Refractories | 10–35 |
| $TiO_2$ | 0–18 |
| $ZrO_2$ | 0–18 |
| $HfO_2$ | 0–18 |
| $TiO_2+ZrO_2+HfO_2$ | 5–20 |
| $SiO_2$ | 0–20 |
| $AlO_{1.5}$ | 0–20 |
| Other related oxides such as $ThO_2$, CdO, ZnO, $WO_3$, PbO, SnO, etc. | 0–20 |
| Non-refractories | 30–65 |
| $PO_{2.5}$ | 12–45 |
| $BO_{1.5}$ | 0–45 |
| Alkali and alkaline earth metal fluxes usually in a presumptively oxide form | 15–40 |

Fluorine (as $F_2^=$) may be used in amounts up to the equivalent of approximately 15 mol percent of oxygen, e.g., 15 mol percent of calcium fluoride ($CaF_2$) may be used in place of 15 mol percent of calcium oxide ($CaO$). The lower content of 15 mol percent for fluxes in the beginning batch is somewhat critical inasmuch as a batch cannot be readily melted and leached if the content of fluxes is below the minimum figure. Higher contents of fluxes than specified in the table are to be avoided for the reason that from such a composition a glass is more difficult to form and generally exhibits less than desirable mechanical strength as a leached structure.

A mixture of various components selected so as to give an approximate compositional analysis within Table IV is melted, usually at approximately 1100–1500° C., and then quenched suitably by pouring the same on a cool bath of water, resulting in the formation of glass particles (frit) of varied shape.

In the alternative, cylinders, cubes, sheets, fibers as well as other desired shapes may be formed using well known principles of glass technology. Small beads preferably are formed from the fractured glass particles resulting from quenching. This may be done by passing particles of the glass through a radiant heating zone or high temperature flame where they are softened sufficiently to permit surface tension forces to form them into small spheres while they are moving through the air. They are then rapidly cooled to prevent devitrification. Articles in the shape of beads or sphericles having a diameter of below approximately 2 mm. are preferred for many ion exchange uses where compact high capacity exchange operation is required. In addition, they are advantageous because during use they are less susceptible to forces causing pulverization of glass structures and the conversion of such structures into powdery fines.

The cooled solid glass particles are then leached by immersing them in a strongly acid solution. The solid original glass particles preferably are not subjected to any special heating step prior to leaching for the reason that a slight drop in the ion exchange capacity of the leached structure may result. But such a special preliminary heating step may be used, if desired, particularly if maximum exchange capacity is not required. Leaching largely removes the flux constituents as well as other glass-modifying constituents which aided in the formation of a glass network during manufacture but are not integral parts of that network. For example aluminum oxide aids in the formation of a network but is not an essential constituent of the stable ion exchange network of our porous residual article. It is largely leached from the original glass composition. Likewise lead oxide, boron oxide, as well as other modifying constituents, are largely leached from the original glass leaving a unique mechanically strong glass network behind. The articles hereof were prepared by immersing approximately 10 grams of raw unleached glass having a particle size of 50–80 mesh is approximately 150 ml. of a five normal solution of nitric acid for the time specified in Table III with continuous agitation at room temperature. Thereafter they were washed with water.

After leaching our porous articles may be dried, if desired, by a controlled evaporation technique. Using such a technique our articles while wet with solvent are placed in an autoclave and heated under pressure to a temperature above the critical temperature of the solvent, i.e., to a temperature at which the solvent cannot be liquefied regardless of the pressure employed. Heating of the wet articles in the closed autoclave causes solvent to evaporate and a high pressure to develop. When a temperature above the critical temperature of the solvent is reached the solvent vapor is vented, that is, allowed to escape from the autoclave, leaving the porous glass articles in a dry unshrunken condition. In practicing the foregoing method, the water used in washing our articles is preferably replaced by a volatile water-miscible organic solvent such as ethyl alcohol. Ethyl alcohol advantageously has a lower critical temperature than water and, therefore, permits the process to be accomplished at a reduced temperature, e.g., around 250° C., and a reduced pressure, e.g., around 65 atmospheres.

Drying of our articles either using the foregoing method or by merely heating them under atmospheric conditions is not an essential step in their preparation. They may be immersed or stored indefinitely in water or an organic solvent without loss of their fundamental properties as herein described, and may be transferred directly from the liquid in which they are stored to solutions in which they are to behave as ion exchangers, adsorbents, etc., without any intermediate handling.

We claim:

1. A glassy article of manufacture comprising a microscopically porous vitrified glassy structure, at least 90 mol percent of said structure consisting essentially, as determined by chemical analysis, of inorganic oxides meeting the compositional requirements set forth in the following table wherein aproximate amounts are specified in mol percent:

| | |
|---|---|
| $TiO_2$ | 0–40 |
| $ZrO_2$ | 0–35 |
| $HfO_2$ | 0–35 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes+$BO_{1.5}$ | 0–25 | said fluxes being selected from the group consisting of oxides of alkali and alkaline earth metals, said structure being characterized by an ion exchange capacity greater than approximately 2 milliequivalents per gram.

2. A glassy article of manufacture comprising a microscopically porous vitrified glassy structure, at least 90 mol percent of said structure consisting essentially, as determined by chemical analysis, of inorganic oxides meeting the compositional requirements set forth in the following table wherein approximate amounts are specified in mol percent:

| | |
|---|---|
| $TiO_2$ | 0–30 |
| $ZrO_2$ | 10–35 |
| $HfO_2$ | 0–30 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes+$BO_{1.5}$ | 0–25 | said fluxes being selected from the group consisting of oxides of alkali and alkaline earth metals, said structure being characterized by an ion exchange capacity greater than approximately 4 milliequivalents per gram.

3. A glassy article of manufacture comprising a microscopically porous vitrified glassy structure, at least 90 mol percent of said structure consisting essentially, as determined by chemical analysis, of inorganic oxides, meeting the compositional requirements set forth in the following table wherein approximate amounts are specified in mol percent:

| | |
|---|---|
| $TiO_2$ | 0–40 |
| $ZrO_2$ | 0–35 |
| $HfO_2$ | 0–35 |
| $TiO_2+ZrO_2+HfO_2$ | 10–40 |
| $SiO_2$ | 0–40 |
| $AlO_{1.5}$ | 0–10 |

| | |
|---|---|
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure including within the 90 mol percent of its composition at least approximately 2 mol percent of inorganic oxides selected from optional constituents in the foregoing table excluding $TiO_2$, $ZrO_2$, $HfO_2$ and $PO_{2.5}$ from the selection, and said structure being characterized by an ion exchange capacity greater than approximately 2 milliequivalents per gram and an effective surface area, as determined by the Brunauer-Emmett-Teller method, greater than approximately 100 square meters per gram.

4. A glassy article of manufacture comprising a microscopically porous vitrified glassy structure, at least 90 mol percent of said structure consisting essentially, as determined by chemical analysis, of inorganic oxides, meeting the compositional requirements set forth in the following table wherein approximate amounts are specified in mol percent:

| | |
|---|---|
| $TiO_2$ | 0–30 |
| $ZrO_2$ | 10–35 |
| $HfO_2$ | 0–30 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure including within the 90 mol percent of its composition at least approximately 2 mol percent of inorganic oxides selected from optional constituents in the foregoing table excluding $TiO_2$, $ZrO_2$, $HfO_2$ and $PO_{2.5}$ from the selection, and said structure being characterized by an ion exchange capacity greater than approximately 4 milliequivalents per gram and an effective surface area, as determined by the Brunauer-Emmett-Teller method, greater than approximately 300 square meters per gram.

5. A glassy article of manufacture comprising a microscopically porous vitrified glassy structure in the form of beads having a diameter smaller than approximately 2 mm., at least 90 mol percent of said structure consisting essentially, as determined by chemical analysis, of inorganic oxides meeting the compositional requirements set forth in the following table wherein approximate amounts are specified in mol percent:

| | |
|---|---|
| $TiO_2$ | 0–40 |
| $ZrO_2$ | 0–35 |
| $HfO_2$ | 0–35 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure being characterized by an ion exchange capacity greater than approximately 2 milliequivalents per gram.

6. A glassy article of manufacture comprising a microscopically porous vitrified glassy structure in the form of beads having a diameter smaller than approximately 2 mm., at least 90 mol percent of said structure consisting essentially, as determined by chemical analysis, of inorganic oxides meeting the compositional requirements set forth in the following table wherein approximate amounts are specified in mol percent:

| | |
|---|---|
| $TiO_2$ | 0–30 |
| $ZrO_2$ | 10–35 |
| $HfO_2$ | 0–30 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure being characterized by an ion exchange capacity greater than approximately 4 milliequivalents per gram.

7. A glassy article of manufacture comprising a microscopically porous vitrified glassy structure in the form of beads having a diameter smaller than approximately 2 mm., at least 90 mol percent of said structure consisting essentially, as determined by chemical analysis, of inorganic oxides meeting the compositional requirements set forth in the following table wherein approximate amounts are specified in mol percent:

| | |
|---|---|
| $TiO_2$ | 0–40 |
| $ZrO_2$ | 0–35 |
| $HfO_2$ | 0–35 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure including within the 90 mol percent of its composition at least approximately 2 mol percent of inorganic oxides selected from optional constituents in the foregoing table excluding $TiO_2$, $ZrO_2$, $HfO_2$ and $PO_{2.5}$ from the selection, and said structure being characterized by an ion exchange capacity greater than approximately 2 milliequivalents per gram and an effective surface area, as determined by the Brunauer-Emmett-Teller method, greater than approximately 100 square meters per gram.

8. A glassy article of manufacture comprising a microscopically porous vitrified glassy structure in the form of beads having a diameter smaller than approximately 2 mm., at least 90 mol percent of said structure consisting essentially, as determined by chemical analysis, of inorganic oxides meeting the compositional requirements set forth in the following table wherein approximate amounts are specified in mol percent:

| | |
|---|---|
| $TiO_2$ | 0–30 |
| $ZrO_2$ | 10–35 |
| $HfO_2$ | 0–30 |
| $TiO_2+ZrO_2+HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5}+BO_{1.5}$ | 20–70 |
| Fluxes | 0–15 |
| Fluxes$+BO_{1.5}$ | 0–25 | said fluxes being selected from the group consisting of oxides of alkali and alkaline earth metals, said structure including within the 90 mol percent of its composition at least approximately 2 mol percent of inorganic oxides selected from optional constituents in the foregoing table excluding $TiO_2$, $ZrO_2$, $HfO_2$ and $PO_{2.5}$ from the selection, and said structure being characterized by an ion exchange capacity greater than approximately 4 milliequivalents per gram and an effective surface area, as determined by the Brunauer-Emmett-Teller method, greater than approximately 300 square meters per gram.

9. A glassy article of manufacture comprising a microscopically porous vitrified glassy structure essentially consisting, as determined by chemical analysis, of the inorganic oxides set forth in the following table with approximate amounts specified in mol percent:

| | |
|---|---|
| $ZrO_2$ | 30 |
| $SiO_2$ | 3 |
| $AlO_{1.5}$ | 4 |
| $PO_{2.5}$ | 63 | said structure being characterized by an ion exchange capacity greater than approximately 5 milliequivalents per gram.

10. The method of removing radioactive ions from a solution containing such ions comprising contacting the radioactive ions of said solution in ion exchange relationship with a porous glassy article, and allowing sufficient time for said radioactive ions to affix themselves to surface areas of said article by ion exchange, said porous glassy article being a microscopically porous vitrified glassy structure, at least 90 mol percent of which consists essentially, as determined by chemical analysis, of inorganic oxides meeting the compositional requirements set forth in the following table wherein approximate amounts are specified in mol percent:

| | |
|---|---|
| $TiO_2$ | 0–40 |
| $ZrO_2$ | 0–35 |
| $HfO_2$ | 0–35 |
| $TiO_2 + ZrO_2 + HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5} + BO_{1.5}$ | 20–70 |
| Fluxes | 0–15 |
| Fluxes $+ BO_{1.5}$ | 0–25 | said fluxes being selected from the group consisting of oxides of alkali and alkaline earth metals, said structure being characterized by an ion exchange capacity greater than approximately 2 milliequivalents per gram.

11. The method of removing radioactive ions from a solution containing such ions comprising contacting the radioactive ions of said solution in ion exchange relationship with a porous glassy article, allowing sufficient time for said radioactive ions to affix themselves to surface areas of said article by ion exchange, and removing said article with affixed ions from said ion exchange relationship, said porous glassy article being a microscopically porous vitrified glassy structure, at least 90 mol percent of which consists essentially, as determined by chemical analysis, of inorganic oxides meeting the compositional requirements set forth in the following table wherein approximate amounts are specified in mol percent:

| | |
|---|---|
| $TiO_2$ | 0–30 |
| $ZrO_2$ | 10–35 |
| $HfO_2$ | 0–30 |
| $TiO_2 + ZrO_2 + HfO_2$ | 10–40 |
| $SiO_2$ | 0–40 |
| $AlO_{1.5}$ | 0–10 |
| $BO_{1.5}$ | 0–25 |
| $PO_{2.5}$ | 20–70 |
| $PO_{2.5} + BO_{1.5}$ | 20–70 |
| Fluxes | 0–15 |
| Fluxes $+ BO_{1.5}$ | 0–25 | said fluxes being selected from the group consisting of oxides of alkali and alkaline earth metals, said structure being characterized by an ion exchange capacity greater than approximately 4 milliequivalents per gram, and an effective surface area, as determined by the Brunauer-Emmett-Teller method, greater than approximately 100 square meters per gram.

12. The method of removing radioactive ions from a solution containing such ions comprising contacting the radioactive ions of said solution in ion exchange relationship with a porous glassy article, allowing sufficient time for said radioactive ions to affix themselves to surface areas of said article by ion exchange, and removing said article with affixed ions from said ion exchange relationship, said porous glassy article being a microscopically porous vitrified glassy structure comprising, as determined by chemical analysis, between 10 and 40 mol percent of oxides, in mol percent proportions as indicated, selected from the group consisting of 0 to 40% $TiO_2$, 0 to 35% $ZrO_2$, 0 to 35% $HfO_2$, and mixtures thereof, and between 20 and 70 mol percent of $PO_{2.5}$, said structure being characterized by an ion exchange capacity greater than approximately 2 milliequivalents per gram, and an effective surface area, as determined by the Brunauer-Emmett-Teller method, greater than approximately 100 square meters per gram.

References Cited in the file of this patent

UNITED STATES PATENTS

| | | |
|---|---|---|
| 1,749,823 | Long | Mar. 11, 1930 |
| 2,042,425 | Kaufmann et al. | May 26, 1936 |
| 2,213,530 | Montere | Sept. 3, 1940 |
| 2,245,783 | Hyde | June 17, 1941 |
| 2,283,172 | Bates | May 19, 1942 |
| 2,477,649 | Pincus | Aug. 2, 1949 |
| 2,577,627 | Pincus | Dec. 4, 1951 |
| 2,578,325 | Sun et al. | Dec. 11, 1951 |
| 2,587,916 | Squier | Mar. 4, 1952 |
| 2,691,599 | Blau | Oct. 12, 1954 |